United States Patent [19]

Kanazawa

[11] Patent Number: 4,881,860
[45] Date of Patent: Nov. 21, 1989

[54] COVER PLATE RETAINING STRUCTURE

[76] Inventor: Hideki Kanazawa, 880, Sekishi-cho, Hamamatsu-shi, Shizuoka, 431-31, Japan

[21] Appl. No.: 152,014

[22] Filed: Feb. 3, 1988

[30] Foreign Application Priority Data

Feb. 10, 1987 [JP] Japan ................................. 62-29125

[51] Int. Cl.$^4$ ........................ F16B 13/06; F16B 21/18
[52] U.S. Cl. ...................................... 411/55; 411/44; 411/353; 403/408.1
[58] Field of Search ....................... 411/44, 54, 55, 57, 411/60, 352, 353, 32, 33; 403/408.1

[56] References Cited

U.S. PATENT DOCUMENTS

| 3,812,756 | 5/1974 | Wenger | 411/353 |
| 3,922,831 | 12/1975 | Fischer | 411/55 |
| 4,470,735 | 9/1984 | Salisbury | 411/353 |

FOREIGN PATENT DOCUMENTS 2429862  1/1976  Fed. Rep. of Germany ........ 411/32
428653 12/1947  Italy ........................................ 411/55

*Primary Examiner*—Neill R. Wilson
*Attorney, Agent, or Firm*—Koda & Androlia

[57] ABSTRACT

A fixing structure in which screw engagement members are applied to mating thread portions formed in a fixed member through mounting holes provided in a mounting member and having a larger diameter than the outer diameter of the screw engagement members to hold the mounting member of the fixed member, said fixing structure is characterized by the provision of engaging members of elastic material which have a free size outer diameter nearly equal to or smaller than the bore diameter of the through mounting holes of the mounting member for engaging said screw engagement members, so that the elastic engaging members radially expand as the screw engagement members move toward engagement with the fixed member to engage themselves with the outer circumference or inner wall of said through mounting holes of the mounting member for securely fixing said mounting member to said fixed member.

3 Claims, 3 Drawing Sheets

COVER PLATE RETAINING STRUCTURE

BACKGROUND OF THE INVENTION

1. Field of the Invention

This invention relates to a fixing structure in which free mounting members are secured to fixed members using screw engagement members.

2. Description of the Prior Art

Openings provided on distributing boards, machines and the like for maintenance purposes are conventionally fixed with covers (mounting members) to seal those openings. To fix a cover on an opening it has been a common practice to insert setscrews (screw engagement members) into female thread portions tapped around the opening on the body (fixed member) of a machine for example, through a plurality of mounting holes provided in the outer circumference of the cover, so that the head portions of the set screws will hold down the surface of the cover.

In the fixing structure mentioned above, the bore diameter of the mounting holes is, needless to say, larger than the outer diameter of the set screws' male thread portions. At the same time, the bore diameter of the mounting holes is generally made smaller than the head portions of the setscrews. Because of this, when the cover is removed from the opening of the machine to do maintenance for example, all of the setscrews should be completely pulled out from the female thread portions.

This tends to make the removal of the cover take time and to cause a risk of losing the setscrews which have been once pulled out.

SUMMARY OF THE INVENTION

This invention aims at removing the above mentioned disadvantages and providing an improved fixing structure. In the fixing structure according to the present invention in which screw engagement members are applied to mating thread portions formed around the opening on a fixed member through a plurality of mounting holes provided in the outer circumference of a mounting member and having a larger diameter than the outer diameter of the screw engagement members to hold the mounting member on the fixed member, said fixing structure is characterized by the provision of engaging members of elastic material which have a free size outer diameter nearly equal to or smaller than the bore diameter of the through mounting holes of the mounting member for engaging said screw engagement members.

The elastic engaging members then radially expand as the screw engagement members move toward engagement with the fixed member to engage themselves with the outer circumference or inner wall of said through mounting holes of the mounting member for securely fixing said mounting member to said fixed member.

In this case, said screw engagement members include not only screws but also nuts.

In the above mentioned fixing structure the screw engagement members which will be always in engagement with the engaging members are previously screwed into the fixed member, upon which the mounting member with the engaging members is mounted through the holes provided therein.

By tightening the screw engagement members the engaging members radially expand as the screw engagement members move toward engagement with the fixed member to engage themselves with the outer circumference or inner wall of said through mounting holes of the mounting member, so that said mounting member is held to the fixed member.

When the screw engagement members are moved toward disengagement for removing the mounting member from the fixed member, the engaging members engaged with the mounting member will shrink radially to release themselves from the mounting member. Thus the mounting member can be removed from the fixed member without pulling out the screw engagement members.

Therefore, by applying the above mentioned structure to the fixing means of a cover on the opening of a machine for example, the loading and unloading of the cover can be made very simple, and in addition, a risk of losing the screw engagement members is securely avoided.

DETAILED DESCRIPTION OF THE PREFERRED EMBODIMENTS

Figure 1:
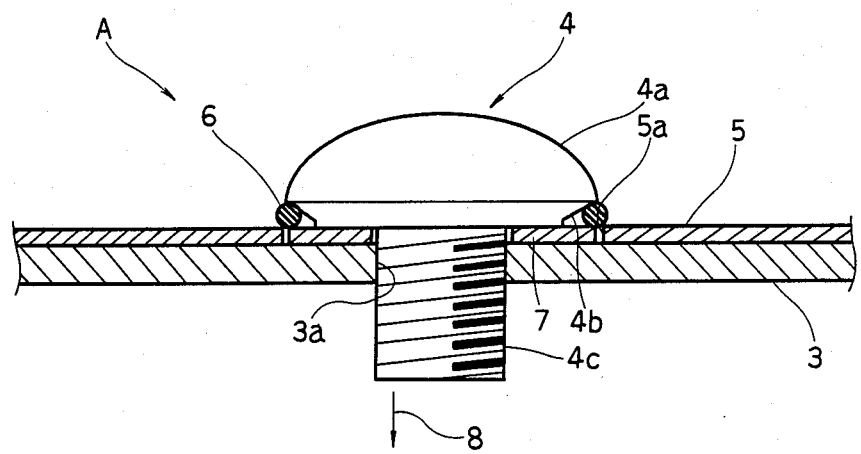
FIG. 1 is a sectional view showing one embodiment of the fixing structure according to the present invention.
Figure 2:
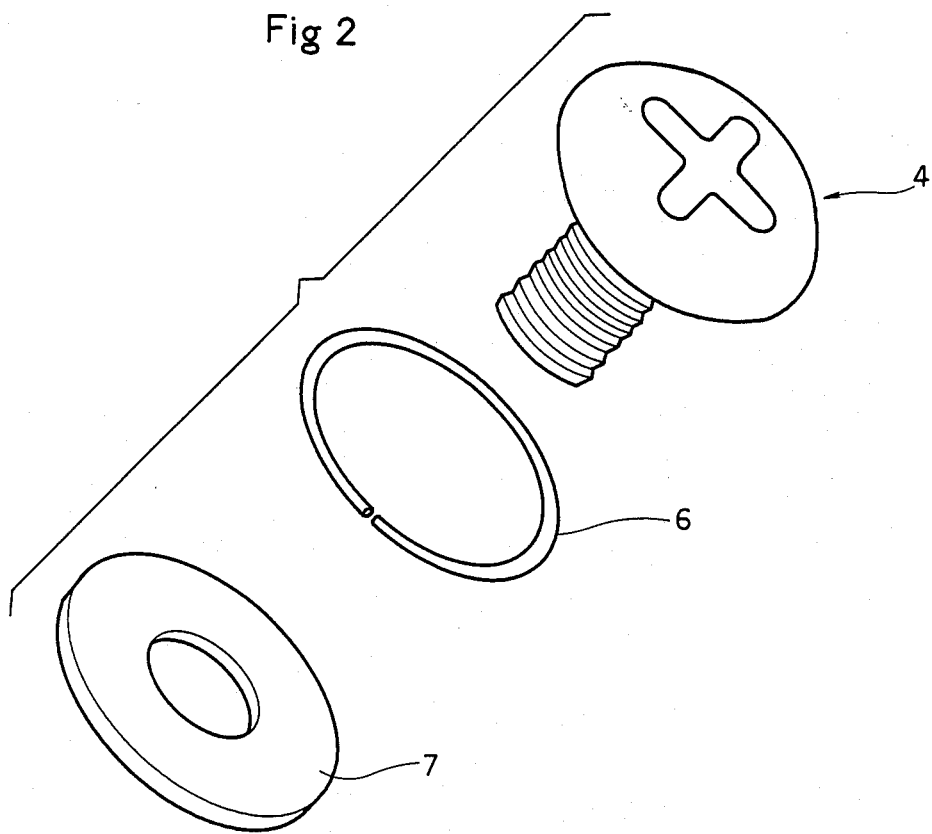
FIG. 2 is a perspective view of screw engagement members, engaging members and washers which compose said fixing structure.

In the embodiment of the fixing structure A, as shown in FIGS. 1 and 2, when a cover (mounting member) 5 is fixed to the body (fixed member) 3 of a machine for example using setscrew (screw engagement members) 4 to be screwed into mating thread portions $3a$ formed around the opening (not shown) of the body 3 through a plurality of mounting holes $5a$ provided in the cover 5 whose bore diameter is larger than the outer diameter of the head $4a$ of each setscrew 4, there are utilized engaging members 6 of elastic material, which have a free size outer diameter nearly equal to or smaller than the bore diameter of each mounting hole $5a$ and are engaged with the heads $4a$ of the setscrews 4, radially expand as the setscrews 4 move toward engagement with the body 3 (direction shown by the arrow 8) to engage themselves with the outer circumference of said through mounting through holes $5a$ of the cover 5, so it is fixed to the body 3.

At the lower circumference of the head $4a$ of the setscrew 4 is formed a supporting part $4b$ having an inclined plane in contact with the inner circumference of each said engaging member 6 for radially expanding the engaging member 6, and at the central portion under the head $4a$ is formed a male thread portion $4c$. Over the male thread portion $4c$ is inserted a washer 7 for supporting the engaging member 6 with the supporting part $4b$.

The washer 7 is made to have a thickness equal to that of the cover 5 and an outer diameter equal to that of the head 4a of the setscrew 4.

Each of the through hole 5a of the cover 5 is used for inserting through the head 4a of the setscrew 4, engaging member 6 and washer 7 when the cover 5 is mounted to or removed from the body 3.

The engaging member 6 is made of an elastic material such as a metal spring member of a circular sectional view which is formed into a ring, and radially expands as the setscrew 4 moves toward engagement with the body 3 to engage the lower surface thereof with the outer circumference of the through mounting hole 5a at the upper surface of the cover 5, so that the cover 5 is held to the body 3.

Figure 3:
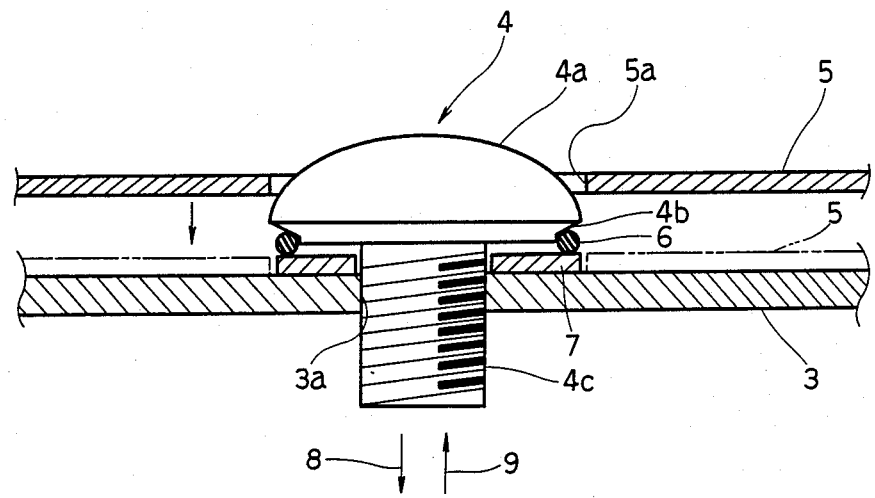
FIG. 3 is an explanatory drawing showing the steps of fixing a mounting member to a fixed member by way of said fixing structure.

The procedures to setup the fixing structure A will now be explained referring to FIG. 3.

In the first place, the engaging member 6 and washer 7 are fitted to the setscrew 4, and this setscrew 4 is then screwed into each one of the mating thread portions 3a of the body 3 until the engaging member 6 is about to be expanded by the insertion of the setscrew 4 with the supporting part 4b.

The cover 5 is placed over the body 3 with each of the through hole 5a thereof passed through with the head 4a of the setscrew 4, engaging member 6 and washer 7. The setscrew 4 is then further screwed down in the direction of the arrow 8.

This makes the engaging member 6 radially expands with the supporting part 4b of the setscrew 4 to cause the lower surface of the engaging member 6 to engage with the outer circumference of the through hole 5a, so that the cover 5 is fixed to the body 3.

When the cover 5 is removed from the body 3, the reverse of the procedures mentioned above will be performed. That is, the setscrew 4 is moved toward disengagement (direction shown by the arrow 9) to cause the engaging member 6 to shrink radially for releasing the engagement between the lower surface of the engaging member 6 and the outer circumference of the through hole 5a. Thus the cover 5 can easily be removed from the body 3 without pulling out the setscrew 4 therefrom.

In the fixing structure A it is one of the essential factors for the setup thereof that the engaging member 6 should be expanded as the setscrew 4 moves toward engagement. To this end the shape of the support part 4b of the setscrew 4 may not be limited to have an inclined plane as in the above embodiment. Also, the cross sectional view of the engaging member 6 may not be limited to be circular. Therefore, it may be square or rectangular.

The other embodiments of the fixing structures B, C, and D according to the present invention will now be explained in order referring to FIGS. 4, 5, ad 6.

Figure 4:
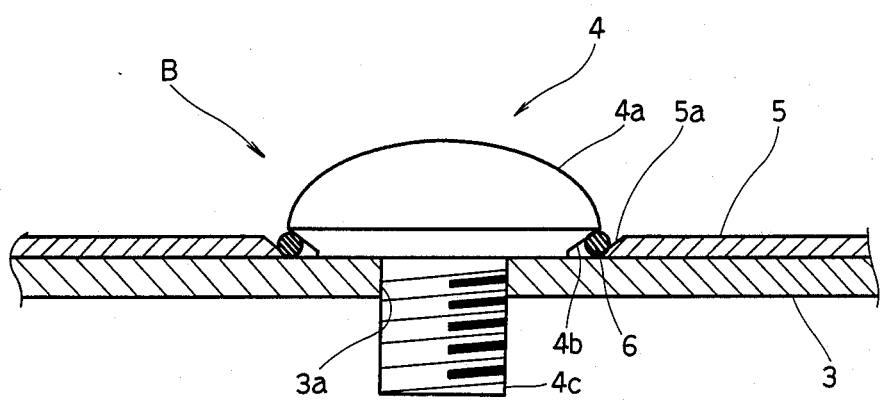
FIG. 4 is a sectional view showing another embodiment of the fixing structure according to the present invention.

The fixing structure B has, as shown in FIG. 4, a through hole 5a whose inner circumference wall is tapered upward. The engagement of this tapered inner circumference wall of the through hole 5a with an engaging member 6 which radially expands with the movement of a setscrew 4 will fix a cover 5 to a body 3.

Figure 5:
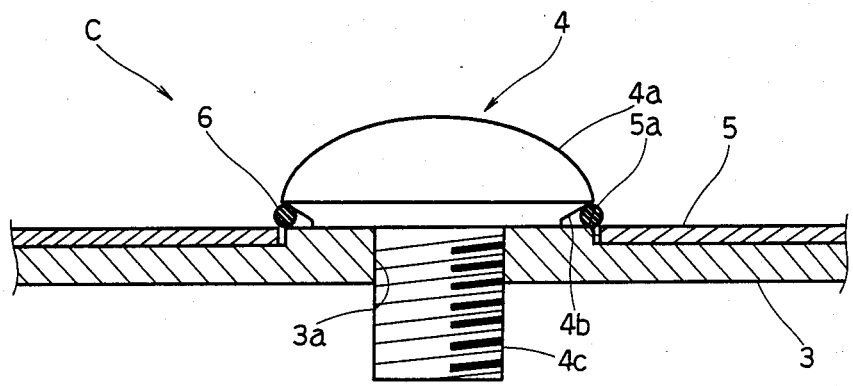
FIG. 5 is a sectional view showing still another embodiment of the fixing structure according to the present invention.

In the fixing structure C, as shown in FIG. 5, there is provided a washer 7 similar to that in the fixing structure A but is made integral with a body 3.

Figure 6:
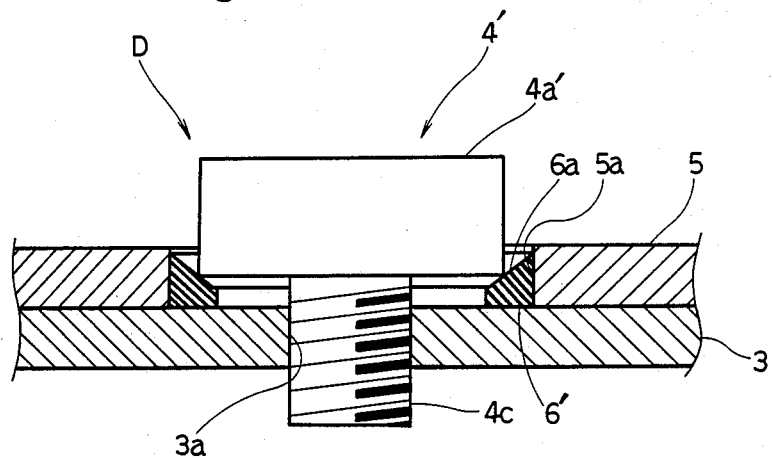
FIG. 6 is a sectional view showing a further embodiment of the fixing structure according to the present invention.

In the fixing structure D, as shown in FIG. 6, there is inserted into a through hole 5a of a cover 5 an engaging member 6' having an inner circumference wall 6a tapered upward and whose sectional view is trapezoidal.

To this inner circumference wall 6a of the engaging member 6' is abutted the lower outer circumference of a head 4a' having a rectangular lateral section of a setscrew 4'.

The movement of the setscrew 4' will then urge the engaging member 6' to expand radially to be pressed against the inner circumference of the through hole 5a of the cover 5. Thus, the cover 5 is fixed to a body 3.

Although using setscrews as the screw engagement member has been described in the embodiments shown above, nuts for mating male screws (bolts for example) previously provided in the body may also be utilized to compose the fixing structure according to the present invention.

The fixing structure of the invention can be applied to any system in which a mounting member is fixed to a fixed member without being limited by the embodiments shown above in which a cover is fixed to a machine body.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A fixing structure of the type wherein a cover plate is retained on a fixed member by a screw engagement member which is screwed in a through hole formed in said cover plate and has a larger diameter than the outer diameter of said screw engagement member, said retaining structure being characterized in that comprising a ring-shaped engaging member having a circular sectional view which is formed by elastic material having a free size outer diameter nearly equal to or smaller than a diameter of said through hole of said cover plate and being expandable in a radial direction, said screw engagement member which is mounted beforehand on said fixed member and has an inclined surface on a bottom outer edge portion, and a washer having a thickness nearly equal to that of said cover plate which is coupled beforehand with said screw engagement member for supporting said engaging member, and said bottom outer edge of said screw engagement member is brought into contact with an inner surface of said ring-shaped engaging member, and said screw engagement member is turned in a screw-in direction against said fixed member to cause said ring-shaped engaging member to be expanded in a radial direction so that said ring-shaped engaging member and upper edge portion of said through hole of said cover plate are engaged and said cover plate is securely fixed on said fixed member.

2. A fixing structure of the type wherein a cover plate is retained on a fixed member by a screw engagement member which is screwed in a through hole formed in said cover plate and has a larger diameter than the outer diameter of said screw engagement member, said retaining structure being characterized in that comprising a ring-shaped engaging member which is formed by elastic material having a free size outer diameter nearly equal to or smaller than a diameter of said through hole of said cover plate and being expandable in a radial direction and has an inclined surface on an inner surface, said screw engagement member which is mounted beforehand on said fixed member, and a washer having a thickness equal to that of said cover plate which is coupled beforehand with said screw engagement member for supporting said engaging member, and said bottom outer edge of said screw engagement member is brought into contact with an inner surface of said ring-shaped engaging member, and said screw engagement member is turned in a screw-in direction against said fixed member to cause said ring-shaped engaging member to be expanded in a radial direction so that said ring-shaped engaging member and upper edge portion of said through hole of said cover plate are engaged and said cover plate is securely fixed on said fixed member.

3. A fixing structure of the type wherein a cover plate is retained on a fixed member by a screw engagement member which is screwed in a through hole formed in said cover plate and has a larger diameter than the outer diameter of said screw engagement member and has a tapered inner wall, said retaining structure being characterized in that comprising a ring-shaped engaging member having a circular sectional view which is formed by elastic material having a free size outer diameter nearly equal to or smaller than a diameter of said through hole of said cover plate and being expandable in a radial direction, and said screw engagement member which is mounted beforehand on said fixed member and has an inclined surface on a bottom outer edge portion, and said bottom outer edge of said screw engagement member is brought into contact with an inner surface of said ring-shaped engaging member, and said screw engagement member is turned in a screw-in direction against said fixed member to cause said ring-shaped engaging member to be expanded in a radial direction so that said ring-shaped engaging member and said tapered inner wall of said through hole of said cover plate are engaged and said cover plate is securely fixed on said fixed member.

* * * * *